United States Patent
Kobayashi (10) Patent No.: US 10,336,332 B2
(45) Date of Patent: Jul. 2, 2019

(54) CONTROLLER FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventor: Katsuya Kobayashi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 15/407,643

(22) Filed: Jan. 17, 2017

(65) Prior Publication Data

US 2017/0217437 A1 Aug. 3, 2017

(30) Foreign Application Priority Data

Jan. 29, 2016 (JP) ................. 2016-016710

(51) Int. Cl.
- *B60W 30/18* (2012.01)
- *F16H 61/16* (2006.01)
- *B60W 10/02* (2006.01)
- *B60W 10/10* (2012.01)
- *F16H 61/22* (2006.01)

(Continued)

(52) U.S. Cl.
CPC ...... *B60W 30/18072* (2013.01); *B60W 10/02* (2013.01); *B60W 10/06* (2013.01); *B60W 10/10* (2013.01); *B60W 10/11* (2013.01); *F16H 61/16* (2013.01); *F16H 61/18* (2013.01); *F16H 61/22* (2013.01); *F16H 63/34* (2013.01); *B60W 2030/1809* (2013.01); *B60W 2030/18081* (2013.01); *B60W 2510/0208* (2013.01); *B60W 2510/0638* (2013.01); *B60W 2520/10* (2013.01); *B60W 2540/04* (2013.01); *B60W 2540/16* (2013.01); *B60W 2710/02* (2013.01); *B60W 2710/1038* (2013.01); *B60W 2710/1044* (2013.01); *B60Y 2300/18083* (2013.01); *F16H 2061/166* (2013.01); *Y02T 10/76* (2013.01)

(58) Field of Classification Search
CPC ........ F16H 2061/166; F16H 2061/207; B60W 30/18072
See application file for complete search history.

(56) References Cited

U.S. PATENT DOCUMENTS

| 8,880,307 B2 * | 11/2014 | Iwao ...................... F02D 11/04 477/107 |
| 2004/0235616 A1 * | 11/2004 | Janecke .................. F16H 61/12 477/70 |

(Continued)

FOREIGN PATENT DOCUMENTS

| DE | 102013206851 A1 | 6/2014 |
| JP | 2012-013185 A | 1/2012 |
| JP | 2014-137087 A | 7/2014 |

*Primary Examiner* — Tisha D Lewis
(74) *Attorney, Agent, or Firm* — Oliff PLC (57) ABSTRACT

An electronic control unit permits a shift operation to a neutral position, by which a manual transmission 14 is switched to neutral, during coasting control. Accordingly, shifting to the neutral position can be performed only by the shift operation. Thus, power transmission can be blocked after termination of the coasting control. In addition, the electronic control unit prohibits the shift operation to a particular gear after the transmission is switched to neutral. Thus, overreving or underreving at the termination of the coasting control can be suppressed.

10 Claims, 8 Drawing Sheets

(51) Int. Cl.
   *F16H 61/18*   (2006.01)
   *F16H 63/34*   (2006.01)
   *B60W 10/06*   (2006.01)
   *B60W 10/11*   (2012.01)

(56) References Cited

U.S. PATENT DOCUMENTS

2013/0116899 A1    5/2013   Iwao et al.
2017/0151951 A1*   6/2017   Jeon ..................... B60W 10/02

* cited by examiner

CONTROLLER FOR VEHICLE AND CONTROL METHOD FOR VEHICLE

INCORPORATION BY REFERENCE

The disclosure of Japanese Patent Application No. 2016-016710 filed on Jan. 29, 2016 including the specification, drawings and abstract is incorporated herein by reference in its entirety.

BACKGROUND OF THE INVENTION

1. Field of the Invention

The invention relates to a controller for a vehicle and a control method for the vehicle and, in particular, to control of a vehicle capable of executing coasting control.

2. Description of Related Art

A vehicle capable of executing coasting control, in which, when a specified condition is established, a clutch provided between an engine and a manual transmission is automatically disengaged and the engine is operated at an idle speed, has been known. A vehicle that includes a coasting controller described in Japanese Patent Application Publication No. 2012-13185 (JP 2012-13185 A) is a typical example. In such a vehicle capable of executing the coasting control, an unintentional operation of a shift lever possibly occurs, for example, when a driver grabs the shift lever during the coasting control. To handle this problem, the coasting controller in JP 2012-13185 A actuates a gear shift prohibition section so as to prohibit the operation of the shift lever during the coasting control. In this way, a shift operation to a gear stage that causes the engine to overrev or underrev is prevented.

SUMMARY OF THE INVENTION

When the shift operation is prohibited during the coasting control as in JP 2012-13185 A, overreving, which occurs when the shift operation to a lower gear stage is performed, is prevented during the coasting control in a high-speed travel, for example. However, the shift operation of the shift lever to a neutral position (an N position) cannot be performed during the coasting control. Accordingly, in the case where the gear shift prohibition section fails and the gear stage is fixed to a specified gear shift stage, for example, such possibilities arise that power transmission cannot be blocked by the shift operation and that the shift operation to another gear shift stage cannot be performed. In addition, the shift operation to the gear stage that is suited for a vehicle speed at a time when coasting is finished cannot be performed before coasting is finished. Thus, overreving or underreving possibly occurs.

The invention provides a controller for a vehicle and a control method for the vehicle capable of switching to neutral through a shift operation by a driver during coasting control and suppressing an engine from overreving or underreving at a time when the coasting control is terminated in a vehicle capable of executing the coasting control.

A first aspect of the invention provides a controller for a vehicle. The vehicle includes an engine, a transmission, a clutch and an electronic control unit. The transmission is configured to gears through a shift operation by a driver. The clutch is configured to connect and disconnect a power transmission route between the engine and the transmission. The electronic control unit is configured to execute coasting control for blocking the power transmission route between the engine and the transmission by the clutch when a specified condition is established during traveling of the vehicle. Further, the electronic control unit is configured to control the transmission so as to prohibit a shift operation to a particular gear when the shift operation, by which the transmission is switched to neutral, is performed by the driver during the coasting control and the clutch operation is not performed by the driver.

According to the above configuration, the shift operation to the neutral position, by which the transmission is switched to neutral, is permitted during the coasting control. Thus, even when a gear shift prohibition section is fixed in a state where the shift position is locked, power transmission can be blocked through the shift operation to the neutral position after termination of the coasting control. In addition, the shift operation to the particular gear is prohibited after the transmission is switched to neutral. Thus, overreving or underreving at the termination of the coasting control can be suppressed.

In the controller for the vehicle, the electronic control unit may be configured to change the particular gear in accordance with a magnitude of a vehicle speed during the coasting control.

According to the above configuration, the particular gear is changed in accordance with the magnitude of the vehicle speed. Accordingly, even when the vehicle speed changes after the initiation of the coasting control, the shift operation to a gear shift stage that is appropriate for the vehicle speed at the termination of the coasting control is permitted. Thus, overreving or underreving, which is caused by the inappropriate gear shift stage, can be suppressed.

A second aspect of the invention provides a control method for a vehicle. The vehicle includes an engine, a transmission, a clutch and an electronic control unit. The transmission is configured to gears through a shift operation by a driver. The clutch is configured to connect and disconnect a power transmission route between the engine and the transmission. The electronic control unit is configured to execute coasting control for blocking the power transmission route between the engine and the transmission by the clutch when a specified condition is established during traveling of the vehicle. Further, the electronic control unit is configured to control the transmission so as to prohibit a shift operation to a particular gear when the shift operation, by which the transmission is switched to neutral, is performed by the driver during the coasting control and the clutch operation is not performed by the driver.

According to the above configuration the shift operation to the neutral position, by which the transmission is switched to neutral, is permitted during the coasting control. Thus, even when a gear shift prohibition section is fixed in a state where the shift position is locked, power transmission can be blocked through the shift operation to the neutral position after termination of the coasting control. In addition, the shift operation to the particular gear is prohibited after the transmission is switched to neutral. Thus, overreving or underreving at the termination of the coasting control can be suppressed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on embodiments of the invention with reference to the drawings. Note that the drawings are appropriately simplified or deformed for the following embodiments and a dimensional ratio, a shape, and the like of each component are not necessarily depicted accurately.

Figure 1:
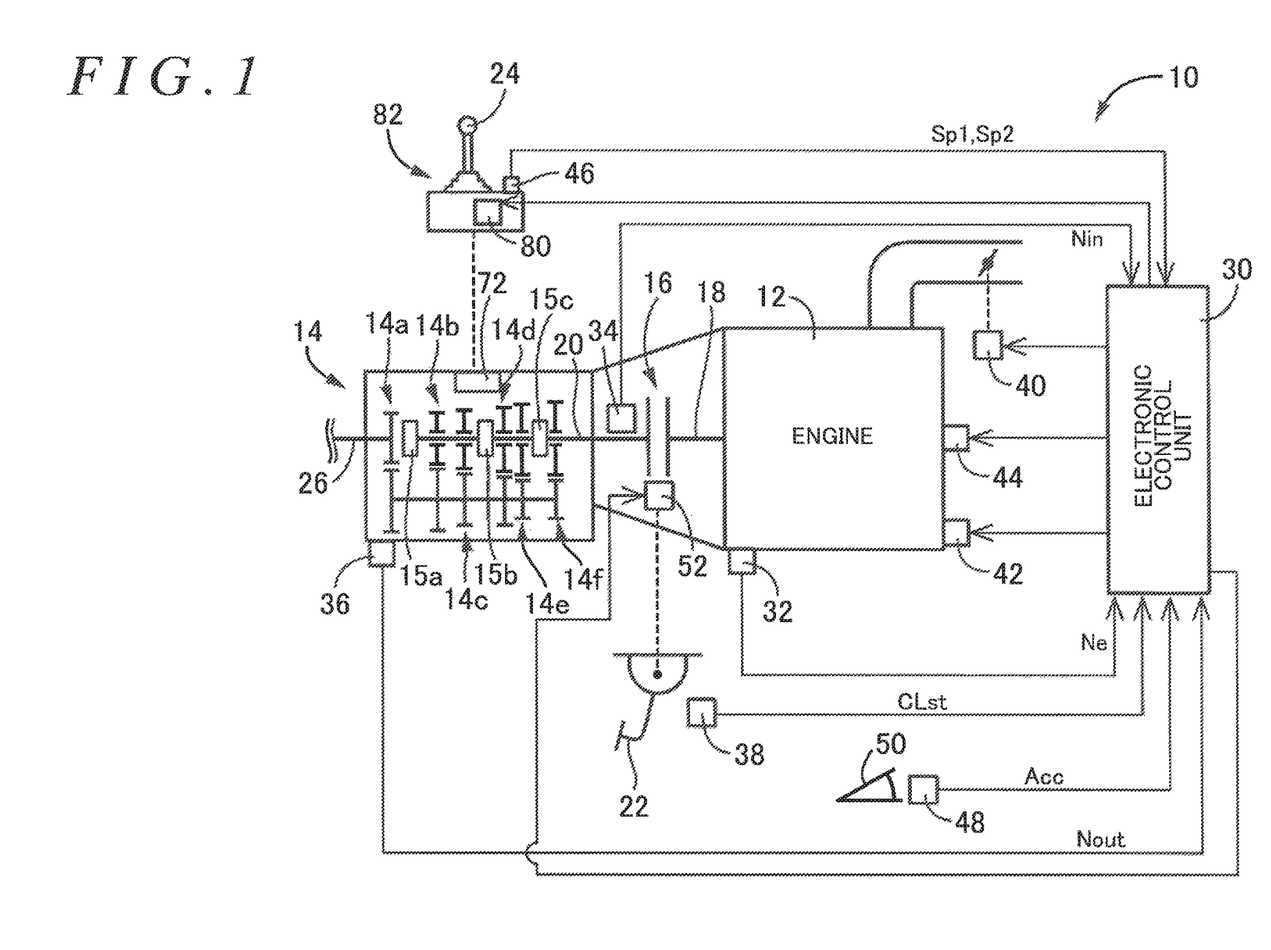
FIG. 1 is a view that schematically shows a drive unit for a vehicle, to which the invention is applied, and a part of a control system of the vehicle.

FIG. 1 is a view that schematically shows a drive unit for a vehicle 10, to which the invention is suitably applied, and a part of a control system thereof. As shown in FIG. 1, the vehicle 10 includes an engine 12 and a manual transmission 14. A clutch 16 is also provided in a power transmission route between the engine 12 and the manual transmission 14. More specifically, the clutch 16 capable of connecting and disconnecting the power transmission route between a crankshaft 18 of the engine 12 and an input shaft 20 of the manual transmission 14 is provided. In the vehicle 10, drive power that is generated by the engine 12 is transmitted to the manual transmission 14 via the clutch 16. Then, the drive power, a rotational speed of which is changed by the manual transmission 14, is transmitted to right and left drive wheels via an output shaft 26, an unillustrated differential device, and the like. The manual transmission 14 is one example of the transmission.

The engine 12 is a drive power source that generates traveling drive power of the vehicle 10, and is, for example, an internal combustion engine such as a gasoline engine or a diesel engine that generates the drive power by combusting fuel. The clutch 16 is usually in a connecting state and connects the power transmission route between the engine 12 and the manual transmission 14. Furthermore, the clutch 16 is brought into a slipping state or a disengaging state by a depressing operation of a clutch pedal 22 so as to block the power transmission route between the engine 12 and the manual transmission 14. That is, the clutch 16 is a connecting and disconnecting device that connects and disconnects transmission of power, which is output from the engine 12, to the manual transmission 14.

The manual transmission 14 is a stepped gear shift mechanism (a manual transmission) of a parallel two-shaft type. When an certain gear shift stage is selectively established from plural gear shift stages through a shift operation (a manual operation) of a shift lever 24 by a driver, the manual transmission 14 reduces or increases a speed of rotation, which is input from the engine 12, at a specified gear shift ratio γ and outputs the rotation. The manual transmission 14 includes plural units of gear pairs 14a to 14f, one of which constantly mesh between two rotational shafts. When the gear pair that corresponds to the gear shift stage to be shifted is connected between the rotational shafts in a manner to enable power transmission, any one of six forward gear shift stages from a first gear shift stage "1st" to a sixth gear shift stage "6th" and a reverse gear shift stage "Rev" is established, for example. In addition, synchromesh mechanisms 15a to 15c (synchronizing mechanisms), each of which synchronizes rotational speeds of the rotational shafts that differ from each other, are provided. Because the synchromesh mechanisms 15a to 15c are actuated during gear shifting, smooth gear shifting can be achieved. When the gear shift stage is not established, the manual transmission 14 is brought into a neutral state (a power transmission blocking state). That is, when the shift operation of the shift lever 24 to a shift position that corresponds to a specified gear shift stage is performed, the manual transmission 14 is shifted to the selected gear shift stage. In addition, when the shift operation of the shift lever 24 to a neutral position, at which none of the gear shift stages is selected, is performed, the manual transmission 14 is brought into the neutral state. As described above, the vehicle 10 is a manual transmission vehicle (an MT vehicle) that includes the manual transmission 14 for selectively establishing the certain gear shift stage from the plural gear shift stages through the shift operation of the shift lever 24 by the driver.

The vehicle 10 includes an electronic control unit 30 that executes various types of control related to the vehicle 10. The electronic control unit 30, which is shown in FIG. 1, is a so-called microcomputer that includes, for example, a CPU, a RAM, a ROM, an input interface, and the like. The electronic control unit 30 is configured to execute various types of the control, such as output control of the engine 12, by using a temporary storage function of the RAM by the CPU and performing signal processing in accordance with a program that is stored in the ROM in advance.

Figure 2:
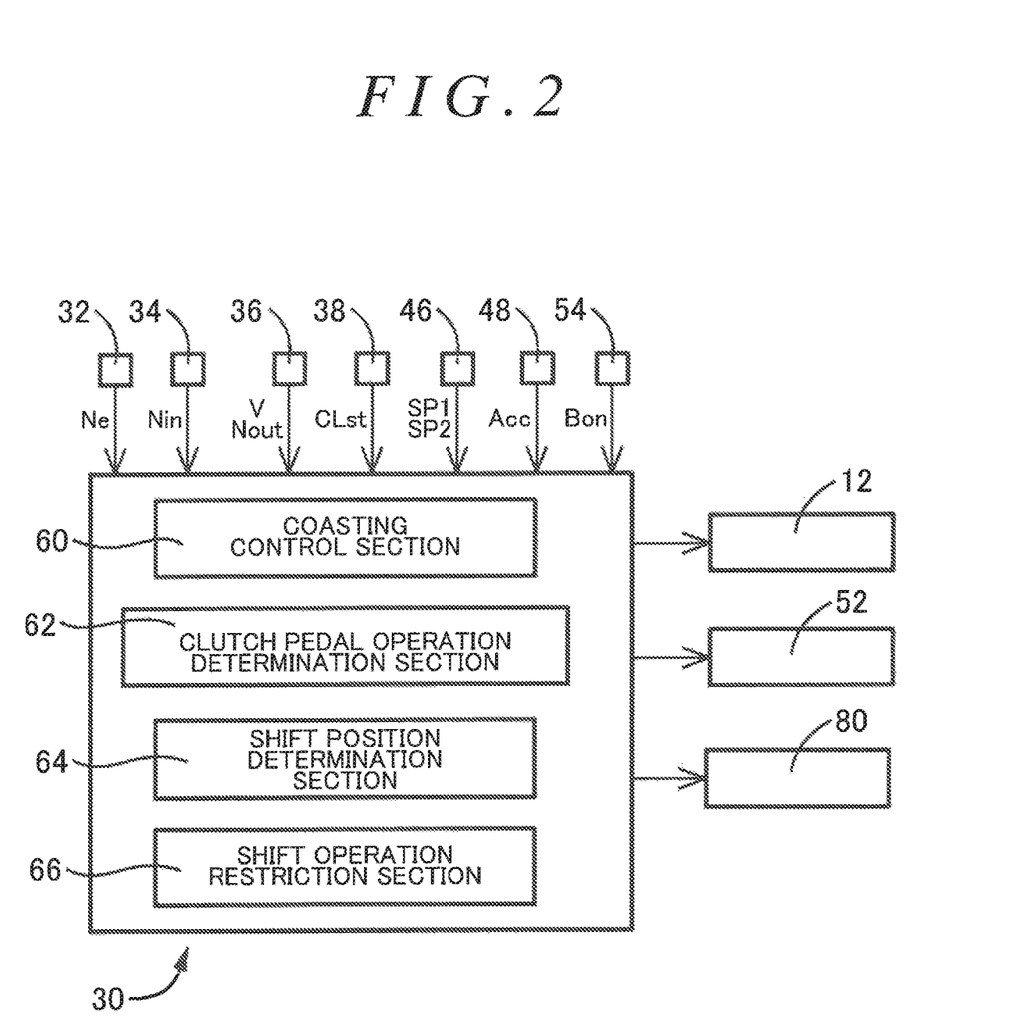
FIG. 2 is a functional block diagram that explains main sections of a control function provided in an electronic control unit in FIG. 1.

As shown in FIG. 1 and FIG. 2, the vehicle 10 is configured that a signal indicative of a detection value of each of various sensors, switches, and the like is supplied to the electronic control unit 30 therefrom. More specifically, the electronic control unit 30 is supplied with: a signal indicative of a speed Ne of the engine 12, that is, a rotational speed of the crankshaft 18 from an engine speed sensor 32; a signal indicative of an input shaft rotational speed Nin of the manual transmission 14, that is, a rotational speed of the input shaft 20 from an input shaft rotational speed sensor 34; a signal indicative of a vehicle speed V that corresponds to an output shaft rotational speed Nout of the output shaft 26 of the manual transmission 14 from a vehicle speed sensor 36; a signal indicative of presence or absence of the depressing operation and an operation amount (a depression amount) CLst of the clutch pedal 22 by the driver from a clutch stroke sensor 38; a signal indicative of a shift position SP1 and a selected position SP2 of the shift lever 24 from a shift select sensor 46; a signal indicative of an accelerator pedal operation amount Acc as an operation amount (a depression amount) of an accelerator pedal 50 from an accelerator pedal operation amount sensor 48; a signal indicative of presence or absence Bon of depression of a brake pedal from a brake switch 54; and the like.

The electronic control unit 30 is configured to output a signal for controlling actuation of each of various devices provided in the vehicle 10. For example, the electronic control unit 30 outputs, as engine output control command signals for the output control of the engine 12, a signal for driving a throttle actuator 40 that controls opening and closing of an electronic throttle valve in accordance with the accelerator pedal operation amount Acc, for example, an injection signal for controlling a fuel amount that is injected from a fuel injector 42, an ignition timing signal for controlling ignition timing of the engine 12 by an igniter 44, and the like. The electronic control unit 30 also outputs a signal for disconnecting the clutch 16, a signal for actuating a shift operation restricting mechanism 80, which will be described below, and the like when a specified condition for executing coasting control is established.

A clutch mechanism 52 that is configured by including a master cylinder, a sleeve cylinder, and the like, which are not shown, is provided between the clutch pedal 22 and the clutch 16. When the clutch pedal 22 is depressed, the master cylinder and the sleeve cylinder are actuated, and the clutch 16 is thereby disconnected. In other words, power transmission between the engine 12 and the manual transmission 14 is blocked. Furthermore, the clutch mechanism 52 can electrically be actuated by a command from the electronic control unit 30 (so-called a clutch-by-wire). More specifically, when the command of disconnecting the clutch 16 is output from the electronic control unit 30, an actuator, which is not shown and is provided in the clutch mechanism 52, is actuated. Then, the sleeve cylinder moves to a clutch disconnection side. In this way, the clutch 16 is disconnected. Because the above configuration is a known technique, a detailed description thereof will not be made.

FIG. 2 is a functional block diagram that explains main sections of a control function provided in the electronic control unit 30. The electronic control unit 30 is functionally configured by including a coasting control section 60, a clutch pedal operation determination section 62, a shift position determination section 64, and a shift operation restriction section 66.

The coasting control section 60, which is shown in FIG. 2, determines whether the specified condition for executing the coasting control is established during traveling of the vehicle, and executes the coasting control when the specified condition is established. More specifically, when determining that the specified condition is established during traveling of the vehicle, the coasting control section 60 controls the clutch mechanism 52 and automatically disconnects the clutch 16 even without the depressing operation of the clutch pedal 22 by the driver. That is, when determining that the specified condition is established during traveling of the vehicle, the coasting control section 60 automatically disconnects the clutch 16 and automatically blocks the power transmission route between the engine 12 and the manual transmission 14. The coasting control section 60 also controls the engine 12 at an idle speed in conjunction with disconnection of the clutch 16. Because the engine 12 is controlled at the idle speed during the coasting control, fuel economy is improved in comparison with a case where the speed of the engine 12 is maintained at a high speed.

In addition, when determining that a specified condition for terminating the coasting control is established, the coasting control section 60 terminates the coasting control. More specifically, when determining that specified condition for terminating the coasting control is established, the coasting control section 60 connects the clutch 16. For example, the coasting control section 60 controls the engine speed Ne to a post clutch connection speed that is computed from the gear ratio γ of the manual transmission 14 and the vehicle speed V, and then connects the clutch 16. Note that the above control of the engine speed Ne does not always have to be executed.

Here, whether the specified condition for executing the coasting control is established is determined on the basis of whether the vehicle speed V and the accelerator pedal operation amount Acc each fall within a region that is set in advance, for example. For example, a two-dimensional map (a coasting control region map) that is configured by including the vehicle speed V and the accelerator pedal operation amount Acc and is used to execute the coasting control is set in advance. When it is determined that the actual vehicle speed V and the actual accelerator pedal operation amount Acc each fall within the region, it is determined that the condition for executing the coasting control is established. Then, the coasting control is executed. In addition, when it is determined that the actual vehicle speed V and the actual accelerator pedal operation amount Acc each fall out of the region during the coasting control, it is determined that the condition for terminating the coasting control is established. Then, the coasting control is terminated. In addition to the above, it is also determined that the condition for terminating the coasting control is established when the clutch pedal 22 is depressed by the driver during the coasting control. Then, the coasting control is terminated. A reason why it is determined by the depression of the clutch pedal 22 that the condition for terminating the coasting control is established is because it can be determined by the depression of the clutch pedal 22 that the driver has an intention of changing a traveling state.

The clutch pedal operation determination section 62 determines whether the depressing operation of the clutch pedal 22 by the driver is performed during coasting by the coasting control section 60. The clutch pedal operation determination section 62 determines presence or absence of the depressing operation of the clutch pedal 22 on the basis of the operation amount CLst of the clutch pedal 22, which is detected by the clutch stroke sensor 38. In the coasting control, the clutch 16 is disconnected in a state where the clutch pedal 22 is not depressed by the driver. Then, when the clutch pedal 22 is depressed by the driver during the coasting control, the clutch pedal operation determination section 62 determines to stop the coasting control. Thus, the clutch pedal operation determination section 62 functions as a means for determining stop of the coasting control.

The shift position determination section 64 determines whether the shift position (the shift operating position) of the shift lever 24 is the neutral position (an N position), at which the manual transmission 14 becomes neutral, in the case where the clutch pedal operation determination section 62 determines that the clutch pedal 22 is not depressed by the driver. Alternatively, the shift position determination section 64 may determine whether the shift operation for switching the manual transmission 14 to neutral is performed by the driver during the coasting control. Whether the shift lever 24 is in the N position is determined on the basis of whether each of the shift position SP1 and the selected position SP2 of the shift lever 24, which are detected by the shift select sensor 46, is located at a position that is set in advance and corresponds to the N position.

In the cases where the shift position determination section 64 determines that the shift lever 24 is located at the N position during the coasting control and the coasting control continues thereafter, the shift operation restriction section 66 actuates the shift operation restricting mechanism 80, which will be described below, so as to prohibit movement of the shift lever 24 from the N position to a shift direction. In other words, the shift operation restriction section 66 prohibits the shift operation of the shift lever 24 from the N position to the shift position that corresponds to each of the gear shift stages.

Figure 3:
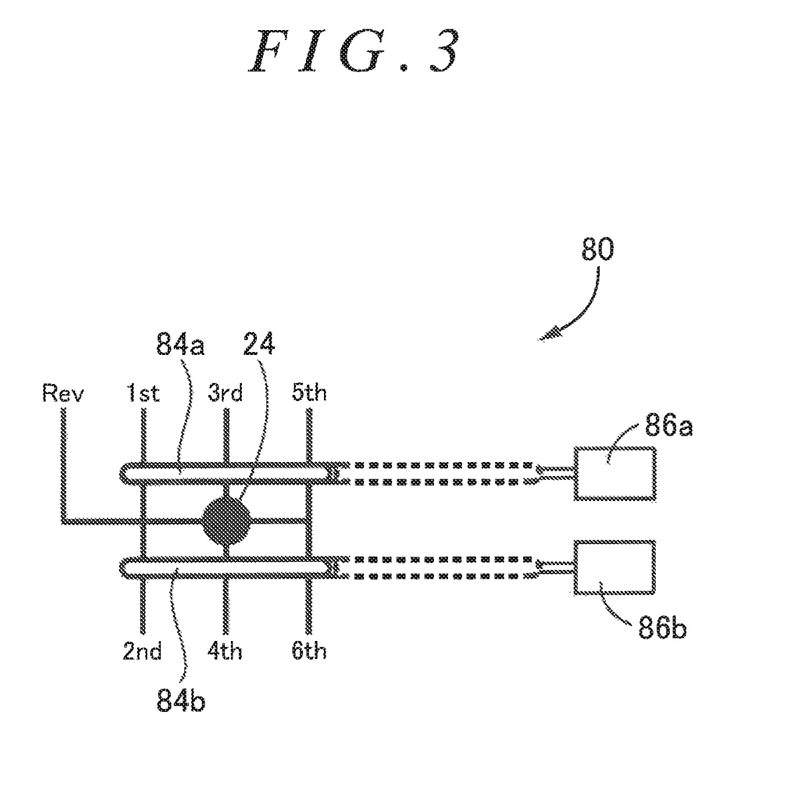
FIG. 3 is a view that shows a structure of a shift operation restricting mechanism in FIG. 1 in a simplified manner.

A description will hereinafter be made on a structure and actuation of the shift operation restricting mechanism 80 of this embodiment. FIG. 3 is a view that shows the structure of the shift operation restricting mechanism 80 in a simplified manner. This shift operation restricting mechanism 80 is provided in a shift switching mechanism 82 that includes the shift lever 24 (see FIG. 1). In FIG. 3, a black circle corresponds to the shift lever 24, and "1st" to "6th" and "Rev" respectively correspond to the shift positions of the shift lever 24 at a time when the shift operations of the shift lever 24 to a first gear stage "1st" to a sixth gear stage "6th" and a reverse gear stage "Rev" are performed. The shift lever 24 moves to each of the shift positions along bold sold lines. For example, when the shift lever 24 moves to a "1st" position, the manual transmission 14 is shifted to the first gear stage "1st". The position of the shift lever 24, which is shown in FIG. 3, corresponds to the N position, at which the manual transmission 14 becomes neutral (power transmission blockage). Note that, in addition to the position shown in FIG. 3, the N position includes positions at which none of the gear shift stages is established, such as a position between the first gear stage "1st" and a second gear stage "2nd", a position between a fifth gear stage "5th" and the sixth gear stage "6th". The shift operation restricting mechanism 80 is included in the manual transmission 14.

Two shift lock pins 84a, 84b are provided, and the shift lock pins 84a, 84b can move to positions at which the shift lock pins 84a, 84b can abut against the shift lever 24 when the shift lever 24 moves along the bold solid lines. These shift lock pins 84a, 84b are configured to be respectively movable between positions indicated by broken lines and positions indicated by solid lines by electric actuators 86a, 86b. Usually, the shift lock pins 84a, 84b are moved to the positions indicated by the broken lines. At this time, the shift lever 24 does not abut against the shift lock pins 84a, 84b, and the shift lever 24 can move to the shift position of each of the gear shift stages. That is, the shift operation to each of the gear shift stages can be performed. Note that the shift lock pins 84a, 84b and the electric actuators 86a, 86b are provided in the shift operation restricting mechanism 80.

Meanwhile, when the shift lock pins 84a, 84b move to the positions indicated by the solid lines, the movement of the shift lever 24 to any of the shift positions, which correspond to the first gear stage "1st" to the sixth gear stage "6th", is blocked by the shift lock pins 84a, 84b. For example, there is a case where the shift lock pin 84a moves to the position indicated by the solid line in a state where the shift lever 24 is located at the N position, which is shown in FIG. 3. In such a case, when the shift lever 24 attempts to move to each of the shift positions that correspond to the first gear stage "1st", a third gear stage "3rd", and the fifth gear stage "5th", the shift lever 24 abuts against the shift lock pin 84a, and the movement thereof to each of these shift positions is inhibited. In addition, there is a case where the shift lock pin 84b moves to the position indicated by the solid line in the state where the shift lever 24 is located at the N position, which is shown in FIG. 3. In such a case, when the shift lever 24 attempts to move to each of the shift positions that correspond to the second gear stage "2nd", a fourth gear stage "4th", and the sixth gear stage "6th", the shift lever 24 abuts against the shift lock pin 84b, and the movement thereof to each of these shift positions is inhibited.

Thus, when the shift lock pins 84a, 84b move to the positions indicated by the solid lines, the shift operation to each of the first gear stage "1st" to the sixth gear stage "6th" cannot be performed. Note that the movement to the shift position that corresponds to the reverse gear stage "Rev" seems to be permitted in FIG. 3 even when the shift lock pins 84a, 84b move to the positions indicated by the solid lines. However, in this embodiment, a stopper mechanism, which is not shown and is provided in the shift switching mechanism 82, prohibits the movement of the shift lever 24 to the shift position that corresponds to the reverse gear stage "Rev" during forward traveling (except for traveling at the extremely low vehicle speed). Because the stopper mechanism is a known technique, a description thereon will not be made. In this embodiment, each of the first gear stage "1st" to the sixth gear stage "6th" is one example of the particular gear shift stage.

The shift operation restriction section 66 controls the electric actuators 86a, 86b when the shift position determination section 64 determines that the shift lever 24 is located at the N position. Then, the shift operation restriction section 66 causes the shift lock pins 84a, 84b to move to the positions indicated by the solid lines in FIG. 3 and thereby prohibits the shift operation to each of the gear shift stages.

In addition, the shift operation restriction section 66 causes the shift lock pins 84a, 84b to move to the positions indicated by the broken lines in FIG. 3 when the clutch pedal operation determination section 62 determines the execution of the depressing operation of the clutch pedal 22 by the driver an the state where the shift lock pins 84a, 84b have moved to the positions indicated by the solid lines in FIG. 3. In other words, the shift operation restriction section 66 cancels the prohibition of the shift operation of the shift lever 24 by the shift lock pins 84a, 84b and permits the shift operation to each of the gear shift stages.

Furthermore, because the depressing operation of the clutch pedal 22 is the condition for terminating the coasting control, the coasting control section 60 terminates the disconnection of the clutch 16 by the coasting control. However, the disconnection of the clutch 16 is continued because the clutch pedal 22 is depressed by the driver. Accordingly, the disconnection of the clutch 16 is continued while the driver depresses the clutch pedal 22. However, when the driver cancels depression of the clutch pedal 22, the clutch 16 is connected.

As described above, when the shift operation of the shift lever 24 from the shift position during the initiation of the coasting control to the N position is performed during the coasting control, the shift operation restriction section 66 is actuated, and the shift operation to each of the gear shift stages is prohibited. Thus, for example, even in the case where the driver grabs the shift lever 24 and unintentionally moves the shift lever 24 in a direction toward the shift position during the coasting control, the shift operation is restricted. Therefore, unintentional gear shifting by the driver can be prevented, and the engine 12 is prevented from overreving or underreving after coasting is terminated.

Meanwhile, the shift operation of the shift lever 24 to the N position is permitted. Thus, the manual transmission 14 can be switched to neutral through the shift operation by the driver. For example, there is a case where the clutch mechanism 52 fails and causes such failure that the clutch 16 is fixed in the connecting state. Even in such a case, the power transmission can be blocked by switching the manual transmission 14 to neutral through the shift operation by the driver.

Figure 4:
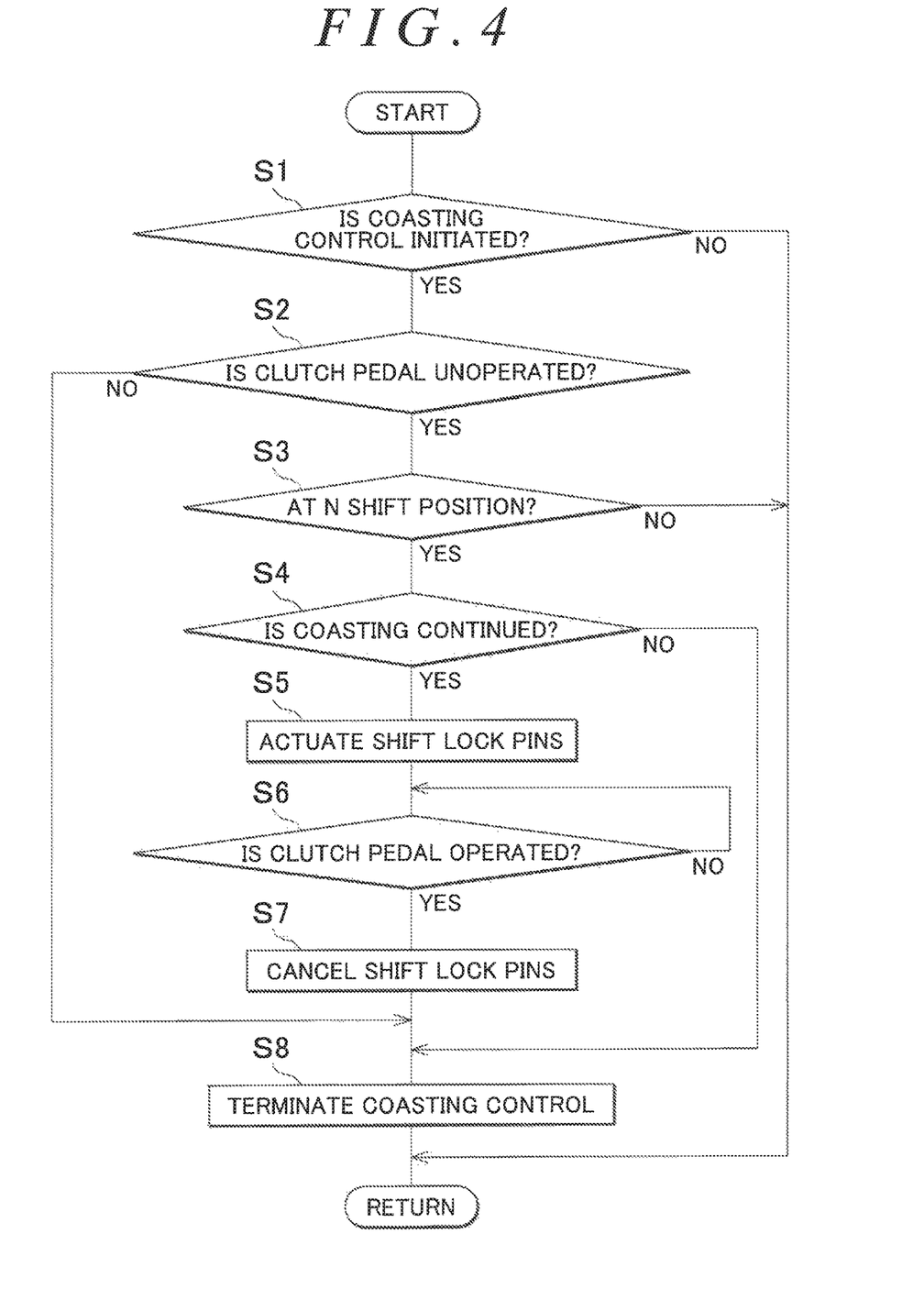
FIG. 4 is a flowchart that explains control actuation of the electronic control unit in FIG. 1, that is, control actuation related to coasting control.

FIG. 4 is a flowchart that explains control actuation of the electronic control unit 30, that is, control actuation related to the coasting control. This flowchart is repeatedly executed during traveling of the vehicle.

First, it is determined in step S1 (hereinafter, the term "step" will be omitted) that corresponds to the coasting control section 60 whether the coasting control is initiated. If the coasting control is not initiated, a negative determination is made in S1, and the process returns. If the coasting control is initiated, a positive determination is made in S1, and the process proceeds to S2. Note that, even when the coasting control is already being executed, the positive determination is made in S1, and the process proceeds to S2.

It is determined in S2 that corresponds to the clutch pedal operation determination section 62 whether the depressing operation of the clutch pedal 22 is unperformed by the driver. If the clutch pedal 22 is depressed, a negative determination is made in S2, and the process proceeds to S8. If the depressing operation of the clutch pedal 22 is not performed, a positive determination is made in S2, and the process proceeds to S3.

It is determined in S3 that corresponds to the shift position determination section 64 whether the shift position of the shift lever 24 is located at the N position. If the shift lever 24 is located at a position other than the N position, a negative determination is made in S3, and the process returns. If the shift lever 24 is located at the N position, a positive determination is made in S3, and the process proceeds to S4.

It is determined in S4 that corresponds to the coasting control section 60 whether the coasting of the vehicle 10 is continued. When the coasting of the vehicle 10 is continued, a positive determination is made in S4, and the process proceeds to S5. When the coasting of the vehicle 10 is not continued, a negative determination is made in S4, and the process proceeds to S8. For example, when it is determined by the coasting control section 60 that the actual vehicle speed V and the actual accelerator pedal operation amount Acc each fall out of the region that is set in advance, the negative determination is made in S4. In addition, when it is determined that the clutch pedal 22 is depressed by the driver, the negative determination is made in S4.

In S5 that corresponds to the shift operation restriction section 66, the shift lock pins 84a, 84b of the shift operation restricting mechanism 80 move to the positions indicated by the solid lines in FIG. 3. In this way, the shift operation of the shift lever 24 to any of the shift positions, which correspond to the first gear stage "1st" to the sixth gear stage "6th", is prohibited.

In a state where the shift operation is prohibited, it is determined in S6 that corresponds to the clutch pedal operation determination section 62 whether the depressing operation of the clutch pedal 22 is performed. While the depressing operation of the clutch pedal 22 is not performed, S6 is repeatedly executed. More specifically, while the coasting control continues, the shift operations to the first gear stage "1st" to the sixth gear stage "6th" are prohibited. Once the driver depresses the clutch pedal 22, a positive determination is made in S6, and the process proceeds to S7.

In S7 that corresponds to the shift operation restriction section 66, the shift lock pins 84a, 84b of the shift operation restricting mechanism 80 move to the positions indicated by the broken lines in FIG. 3 (cancellation of the shift lock pins), and the prohibition of the shift operation of the shift lever 24 to each of the gear shift stages by the shift lock pins 84a, 84b is cancelled. In other words, the shift operation of the shift lever 24 to each of the gear shift stages is permitted.

In S8 that corresponds to the coasting control section 60, the coasting control is terminated. More specifically, the disconnection of the clutch 16, which is executed for the control, is terminated. Thus, when the depression of the clutch pedal 22 is canceled, the clutch 16 is mechanically connected.

As described above, according to this embodiment, the shift operation to the neutral position, which is performed to switch the manual transmission 14 to neutral, is permitted during the coasting control. Thus, even when the shift operation restricting mechanism 80 is fixed in a state of being actuated, the power transmission can be blocked by the shift operation to the neutral position after the termination of the coasting control. In addition, the shift operation to each of the gear shift stages is prohibited after the manual transmission 14 is switched to neutral. Therefore, overreving or underreving at the termination of the coasting control can be suppressed.

Next, a description will be made on another embodiment of the invention. Note that, in the following description, portions that are in common with those in the above-described embodiment are denoted by the same reference numerals and descriptions thereon will not be made.

Figure 5:
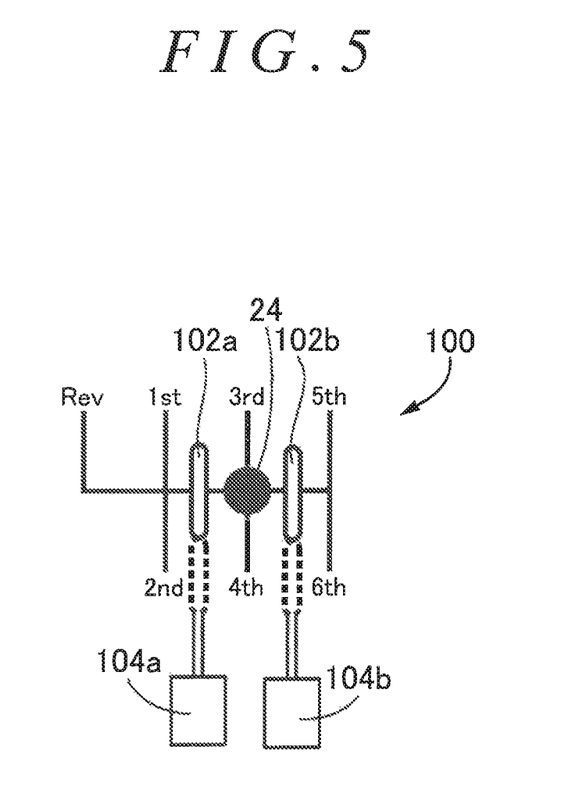
FIG. 5 is a view of a structure of a shift operation restricting mechanism as another embodiment of the invention.

In the above-described embodiment, when the shift operation to the N position is performed during the coasting control, the shift operations to the first gear stage "1st" to the sixth gear stage "6th" are uniformly prohibited. However, in this embodiment, the prohibited gear shift stages may be set in accordance with the vehicle speed during the coasting control. FIG. 5 is a view of a structure of a shift operation restricting mechanism 100 as the other embodiment of the invention. Similar to the above-described embodiment, a black circle corresponds to the shift lever 24, numbers 1 to 6 respectively correspond to the shift positions of the shift lever 24 that correspond to the first gear stage "1st" to the sixth gear stage "6th".

In addition, two shift lock pins 102a, 102b are provided. The two shift lock pins 102a, 102b can move to positions at which the shift lock pins 102a, 102b can abut against the shift lever 24 when the shift lever 24 moves along bold solid lines. These shift lock pins 102a, 102b are configured to be movable between positions indicated by solid lines and positions indicated by broken lines by electric actuators 104a, 104b, respectively.

When the shift lock pins 102a, 102b are located at the positions indicated by the broken lines, the shift lever 24 does not abut against the shift lock pins 102a, 102b. Thus, the shift operation to each of the gear shift stages can be performed.

Meanwhile, when the shift lock pin 102a moves to the position indicated by the solid line, a position between a combination of the first and second gear stages "1st", "2nd" and the reverse gear stage "Rev" and a combination of the third gear stage "3rd" to the sixth gear stage "6th" is blocked by the shift lock pin 102a. In other words, a selecting operation of the shift lever 24 is prohibited at the position between the combination of the first and second gear stages "1st", "2nd" and the reverse gear stage "Rev" and the combination of the third gear stage "3rd" to the sixth gear stage "6th". For example, in the case where the shift lever 24 is located at a position indicated by the black circle in FIG. 5 (the N position) and the shift lock pin 102a moves to the position indicated by the solid line, the shift operations of the shift lever 24 to the third gear stage "3rd" to the sixth gear stage "6th" are permitted. On the other hand, the shift operations thereof to the first gear stage "1st", the second gear stage "2nd", and the reverse gear stage "Rev" are prohibited.

Meanwhile, when the shift lock pin 102b moves to the position indicated by the solid line, a position between a combination of the first gear stage "1st" to the fourth gear stage "4th" (and the reverse gear stage "Rev") and a combination of the fifth gear stage "5th" and the sixth gear stage "6th" is blocked by the shift lock pin 102b. In other words, the selecting operation of the shift lever 24 is prohibited at a position between the combination of the first gear stage "1st" to the fourth gear stage "4th" and the combination of the fifth gear stage "5th" and the sixth gear stage "6th". For example, in the case where the shift lever 24 is located at the position indicated by the black circle (the N position) and the shift lock pin 102b moves to the position indicated by the solid line, the shift operations of the shift lever 24 to the first gear stage "1st" to the fourth gear stage "4th" are permitted. On the other hand, the shift operations thereof to the fifth gear stage "5th" and the sixth gear stage "6th" are prohibited.

As described above, in this embodiment, the movement of the shift lever 24 to the N position is permitted, and the shift operations to the specified gear shift stages are also permitted. The specified gear shift stages are changed in accordance with the vehicle speed V of the vehicle as will be described below.

Figure 6:
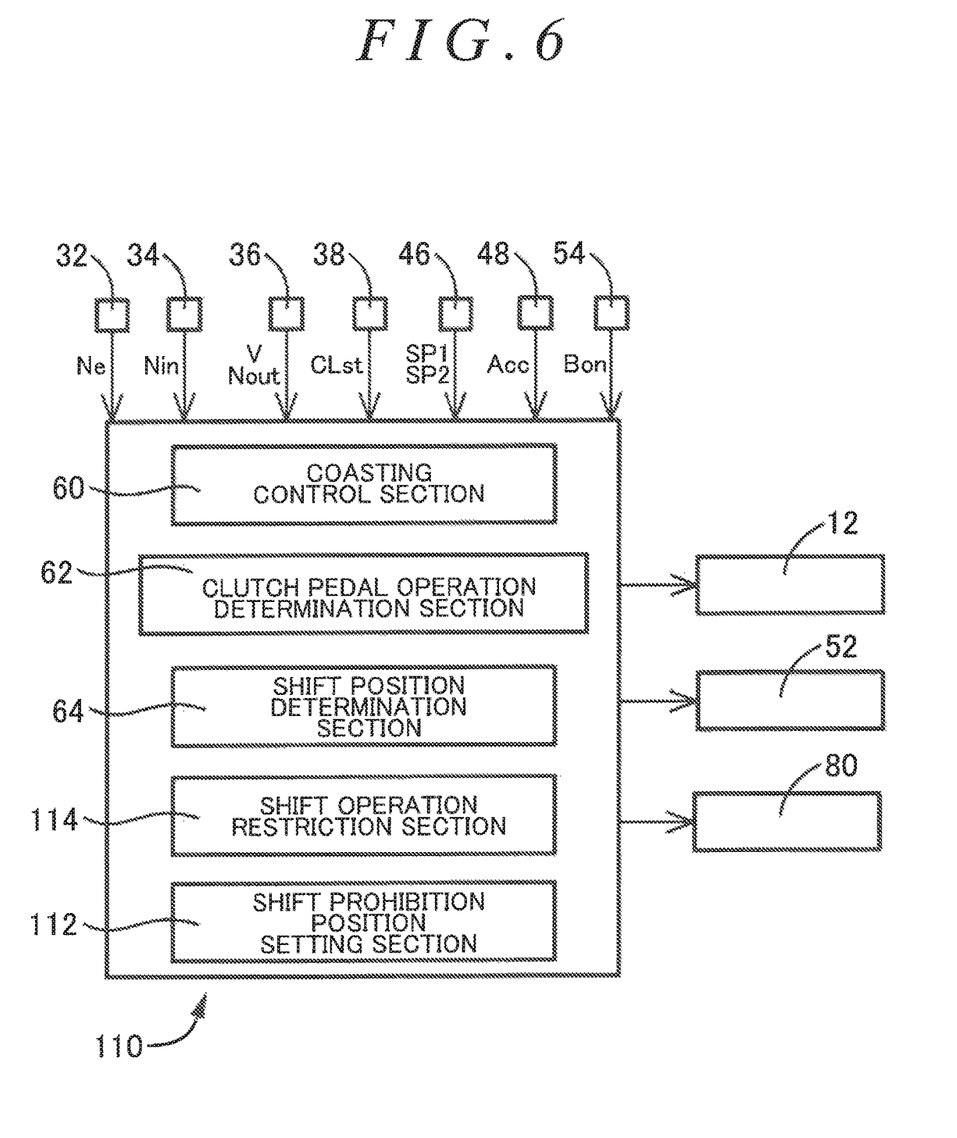
FIG. 6 is a functional block diagram that explains main sections of a control function provided in an electronic control unit of this embodiment.

FIG. 6 is a functional block diagram that explains main sections of a control function provided in an electronic control unit 110 of this embodiment. In FIG. 6, a shift prohibition position setting section 112 detects and stores the current shift position of the shift lever 24. Then, in accordance with the current shift position of the shift lever 24 and the vehicle speed V of the vehicle, the shift prohibition position setting section 112 sets the gear shift stage (hereinafter, a shift prohibition gear shift stage), to which the shift operation is prohibited. The shift prohibition gear shift stage is example of the particular gear shift stage.

Figure 7:
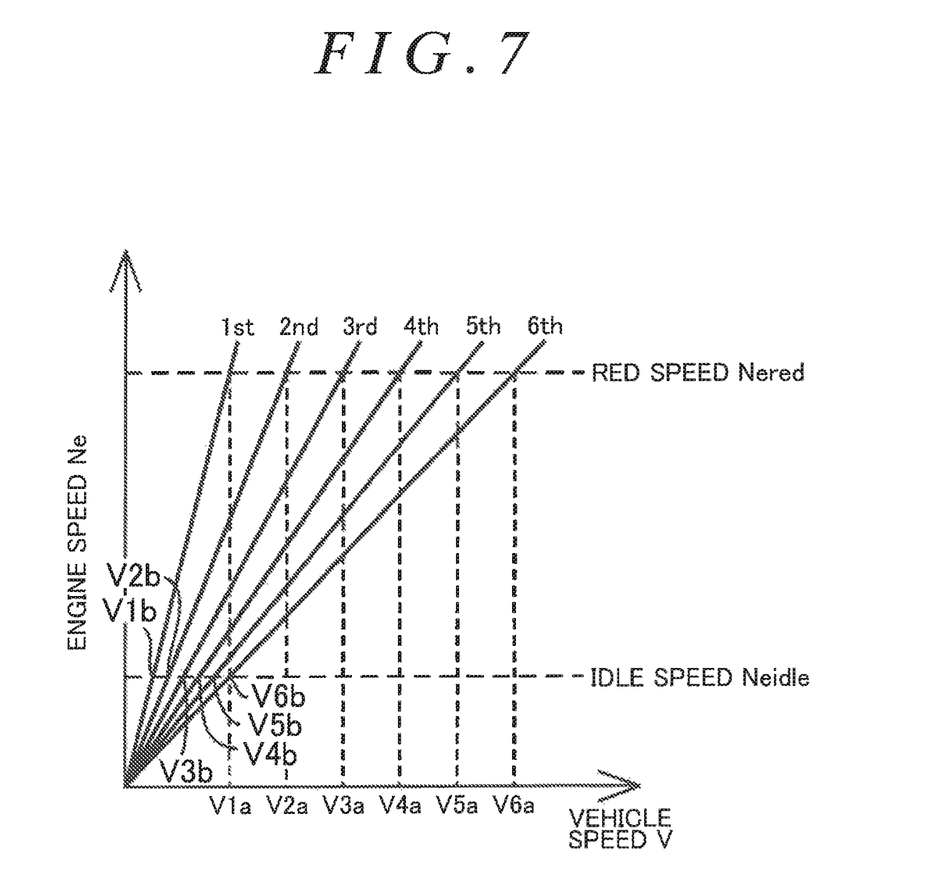
FIG. 7 is a graph of a relationship between a vehicle speed and an engine speed at each gear shift stage.

The shift prohibition position setting section 112 sets the shift prohibition gear shift stage in accordance with a magnitude of the vehicle speed V. FIG. 7 is a graph of a relationship between the vehicle speed V and the engine speed Ne at each of the gear shift stages. As shown in FIG. 7, when each of the gear shift stages is defined, the engine speed Ne is increased as the vehicle speed V is increased. In addition, as the gear shift stage is lowered, the engine speed Ne is increased at the same vehicle speed V. An RED speed Nered in FIG. 7 is an upper limit speed of the engine 12 on a high rotation side (an overreving speed) that is set in advance, and is set at a speed at which seizure of the engine 12 possibly occurs or at a speed at which seizure of a gear in the manual transmission 14 possibly occurs. Alternatively, the RED speed Nered may be set at a speed at which the driver receives a sense of discomfort. An idle speed Neidle is a lower limit speed of the engine 12 on a low rotation side that is set in advance. The idle speed Neidle is set at such a speed that an engine stalls when the engine speed Ne falls below this lower limit speed or a speed at which an oil pump cannot feed a sufficient amount of oil. Alternatively, the idle speed Neidle may be set at a speed at which the driver receives the sense of discomfort. Thus, the gear shift stage, at which the post gear-shifting engine speed Ne falls within a speed range between the idle speed Neidle and the RED speed Nered (becomes a permitted speed), becomes the permitted gear shift stage. Meanwhile, the gear shift stage, at which the post gear-shifting engine speed Ne falls out of the above speed range, corresponds to the shift prohibition gear shift stage.

In FIG. 7, the vehicle speed V at which the engine speed Ne becomes the RED speed Nered at the first gear stage "1st" is set as V1a, the vehicle speed V at which the engine speed Ne becomes the RED speed Nered at the second gear stage "2nd" is set as V2a, the vehicle speed V at which the engine speed Ne becomes the RED speed Nered at the third gear stage "3rd" is set as V3a, the vehicle speed V at which the engine speed Ne becomes the RED speed Nered at the fourth gear stage "4th" is set as V4a, the vehicle speed V at which the engine speed Ne becomes the RED speed Nered at the fifth gear stage "5th" is set as V5a, and the vehicle speed V at which the engine speed Ne becomes the RED speed Nered at the sixth gear stage "6th" is set as V6a. At this time, when V1a≤V<V2a, the first gear stage "1st" is prohibited, and the second gear stage "2nd" to the sixth gear stage "6th" are permitted. That is, the first gear stage "1st" is set as the shift prohibition gear shift stage. When V2a≤V<V3a, the first gear stage "1st" and the second gear stage "2nd" are prohibited, and the third gear stage "3rd" to the sixth gear stage "6th" are permitted. That is, the first gear stage "1st" and the second gear stage "2nd" are set as the shift prohibition gear shift stages. When V3a≤V<V4a, the first gear stage "1st" to the third gear stage "3rd" are prohibited, and the fourth gear stage "4th" to the sixth gear stage "6th" are permitted. That is, the first gear stage "1st" to the third gear stage "3rd" are set as the shift prohibition gear shift stages. When V4a≤V<V5a, the first gear stage "1st" to the fourth gear stage "4th" are prohibited, and the fifth gear stage "5th" and the sixth gear stage "6th" are permitted. That is, the first gear stage "1st" to the fourth gear stage "4th" are set as the shift prohibition gear shift stages. When V5a≤V<V6a, the first gear stage "1st" to the fifth gear stage "5th" are prohibited, and the sixth gear stage "6th" is permitted. That is, the first gear stage "1st" to the fifth gear stage "5th" are set as the shift prohibition gear shift stages.

In addition, in FIG. 7, the vehicle speed V at which the engine speed Ne becomes the idle speed Neidle at the first gear stage "1st" is set as V1b, the vehicle speed V at which the engine speed Ne becomes the idle speed Neidle at the second gear stage "2nd" is set as V2b, the vehicle speed V at which the engine speed Ne becomes the idle speed Neidle at the third gear stage "3rd" is set as V3b, the vehicle speed V at which the engine speed Ne becomes the idle speed Neidle at the fourth gear stage "4th" is set as V4b, the vehicle speed V at which the engine speed Ne becomes the idle speed Neidle at the fifth gear stage "5th" is set as V5b, and the vehicle speed V at which the engine speed Ne becomes the idle speed Neidle at the sixth gear stage "6th" is set as V6b. At this time, when V1b≤V<V2b, the first gear stage "1st" is permitted, and the second gear stage "2nd" to the sixth gear stage "6th" are prohibited. That is, the second gear stage "2nd" to the sixth gear stage "6th" are set as the shift prohibition gear shift stages. When V2b≤V<V3b, the first gear stage "1st" and the second gear stage "2nd" are permitted, and the third gear stage "3rd" to the sixth gear stage "6th" are prohibited. That is, the third gear stage "3rd" to the sixth gear stage "6th" are set as the shift prohibition gear shift stages. When V3b≤V<V4b, the first gear stage "1st" to the third gear stage "3rd" are permitted, and the fourth gear stage "4th" to the sixth gear stage "6th" are prohibited. That is, the fourth gear stage "4th" to the sixth gear stage "6th" are set as the shift prohibition gear shift stages. When V4b≤V<V5b, the first gear stage "1st" to the fourth gear stage "4th" are permitted, and the fifth gear stage "5th" and the sixth gear stage "6th" are prohibited. That is, the fifth gear stage "5th" and the sixth gear stage "6th" are set as the shift prohibition gear shift stages. When V5b≤V<V6b, the first gear stage "1st" to the fifth gear stage "5th" are permitted, and the sixth gear stage "6th" is prohibited. That is, the sixth gear stage "6th" is set as the shift prohibition gear shift stage.

When the coasting control is initiated and the shift operation of the shift lever 24 to the N position is performed, a shift operation restriction section 114 actuates the shift operation restricting mechanism 100 and prohibits the shift operation to the shift prohibition gear shift stage, which is set by the shift prohibition position setting section 112.

For example, when the shift operation of the shift lever 24 to the N position is performed during the coasting at the vehicle speed V of V2b to V3b, the shift operation restriction section 114 prohibits the shift operation to each of the first gear stage "1st" and the second gear stage "2nd", the shift operation to which is prohibited. Then, the shift operation restriction section 114 controls the electric actuator 104a and causes the shift lock pin 102a to move from the position indicated by the broken line to the position indicated by the solid line. In this way, the shift operations to the first gear stage "1st" and the second gear stage "2nd" are prohibited.

In addition, for example, when the shift operation of the shift lever 24 to the N position is performed during the coasting at the vehicle speed V of V4b to V5b, the shift operation restriction section 114 prohibits the shift operation to each of the fifth gear stage "5th" and the sixth gear stage "6th", the shift operation to which is prohibited. Then, the shift operation restriction section 114 controls the electric actuator 104b and causes the shift lock pin 102b to move from the position indicated by the broken line to the position indicated by the solid line. In this way, the shift operations of the shift lever 24 to the shift positions that correspond to the fifth gear stage "5th" and the sixth gear stage "6th" are prohibited.

When the clutch pedal operation determination section 62 determines the depression of the clutch pedal 22 by the driver, the shift operation restriction section 114 causes the shift lock pins 102a, 102b to move to the positions indicated by the broken lines and cancels the prohibition of the shift operation.

Due to execution of the above control, even when the driver performs the shift operation during the coasting control, the engine 12 is prevented from overreving or underreving after the coasting control is terminated.

Figure 8:
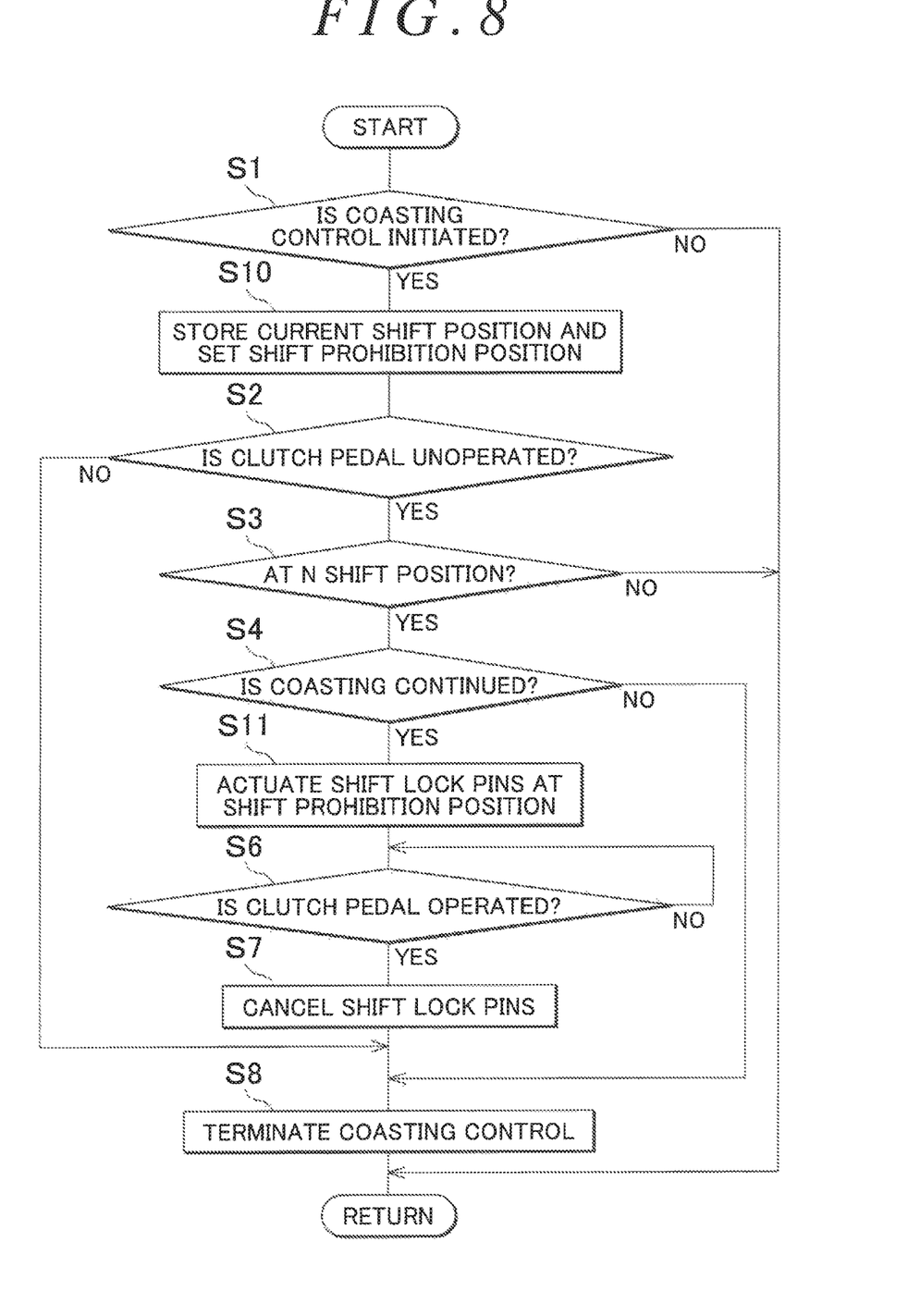
FIG. 8 is a flowchart that explains control actuation of the electronic control unit in FIG. 6, that is, control actuation related to coasting control.

FIG. 8 is a flowchart that explains control actuation of the electronic control unit 110, that is, control actuation related to the coasting control. This flowchart is repeatedly executed during traveling of the vehicle.

First, it is determined in step S1 (hereinafter, step will be omitted) that corresponds to the coasting control section 60 whether the coasting control is initiated. If the coasting control is not initiated, the negative determination is made in S1, and the process returns. If the coasting control is initiated, the positive determination is made in S1, and the process proceeds to S2. Note that, even when the coasting control is already being executed, the positive determination is made in S1, and the process proceeds to S2.

In S10 that corresponds to the shift prohibition position setting section 112, the current shift position of the shift lever 24 is detected and stored, and the shift prohibition gear shift stage (a shift prohibition position) is set on the basis of the current shift position of the shift lever 24 and the vehicle speed V.

It is determined in S2 that corresponds to the clutch pedal operation determination section 62 whether the depressing operation of the clutch pedal 22 is unperformed by the driver. If the clutch pedal 22 is depressed, the negative determination is made in S2, and the process proceeds to S8. If the depressing operation of the clutch pedal 22 is not performed, the positive determination is made in S2, and the process proceeds to S3.

It is determined in S3 that corresponds to the shift position determination section 64 whether the shift position of the shift lever 24 is located at the N position. If the shift lever 24 is located at the position other than the N position, the negative determination is made in S3, and the process returns. If the shift lever 24 is located at the N position, the positive determination is made in S3, and the process proceeds to S4.

It is determined in S4 that corresponds to the coasting control section 60 whether the costing of the vehicle 10 is continued. When the coasting of the vehicle 10 is continued, a positive determination is made in S4, and the process proceeds to S11. When the coasting of the vehicle 10 is not continued, a negative determination is made in S4, and the process proceeds to S8. For example, when it is determined by the coasting control section 60 that the actual vehicle speed V and the actual accelerator pedal operation amount Acc each fall out of the region that is set in advance, the negative determination is made in S4. In addition, when it is determined that the clutch pedal 22 is depressed by the driver, the negative determination is made in S4.

In S11 that corresponds to the shift operation restriction section 114, the shift operation to the shift prohibition gear shift stage, which is set in S10, is prohibited. For example, when the vehicle speed V is V2b to V3b in FIG. 7, the shift lock pin 102a moves to the position indicated by the solid line in FIG. 5, and the shift operations to the first gear stage "1st" and the second gear stage "2nd" are prohibited. In addition, when the vehicle speed V is V4b to V5b, the shift lock pin 102b moves to the position indicated by the solid line in FIG. 5, and the shift operations to the fifth gear stage "5th" and the sixth gear stage "6th" are prohibited.

It is determined in S6 that corresponds to the clutch pedal operation determination section 62 whether the depressing operation of the clutch pedal 22 is performed in the state where the shift operation is restricted. While the depressing operation of the clutch pedal 22 is not performed, S6 is repeatedly executed. Once the driver depresses the clutch pedal 22, the positive determination is made in S6, and the process proceeds to S7.

In S7 that corresponds to the shift operation restriction section 114, the shift lock pins 102a, 102b of the shift operation restricting mechanism 100 move to the positions indicated by the broken lines in FIG. 5 (cancellation of the shift lock pins). Then, the prohibition of the shift operations of the shift lever 24 to the shift positions that correspond to the first gear stage "1st" to the sixth gear stage "6th" is cancelled. In other words, the shift operation thereof to each of the gear shift stages is permitted.

In S8 that corresponds to the coasting control section 60, the coasting control is terminated. More specifically, the disconnection of the clutch 16, which is executed for the control, is terminated. Thus, when the depression of the clutch pedal 22 is canceled, the clutch 16 is mechanically connected.

Due to the control as described above, the shift lever 24 can move to the N position, and the manual transmission 14 can be switched to neutral even during the coasting control. Furthermore, in regard to the gear shift stage, at which the post-coasting engine speed Ne falls within a permitted speed range, the shift operation to the gear shift stage can be performed. Therefore, the shift operation to the certain gear shift stage can be performed through the operation of the shift lever 24 by the driver.

As described above, the same effects as those of the above-described embodiment can be obtained by this embodiment. In addition, in this embodiment, in regard to the gear shift stage, at which the post-coasting engine speed Ne falls within the permitted speed range, the shift operation thereto can be performed. Thus, smooth acceleration can be realized at the termination of the coasting control, for example.

Furthermore, the gear shift stage, the shift operation to which is prohibited, is changed in accordance with the magnitude of the vehicle speed V during the coasting control. In this way, even when the vehicle speed changes from that at the initiation of the coasting control, the shift operation to the gear shift stage that is appropriate for the vehicle speed at the termination of the coasting control is permitted. Thus, overreving or underreving, which is caused by the inappropriate gear shift stage, can be suppressed.

The embodiments of the invention have been described in detail so far on the basis of the drawings. However, the invention is also applied to other aspects.

For example, in the above-described embodiment, the shift operation restricting mechanism 100 prohibits the shift operations to the first gear stage "1st", the second gear stage "2nd", and the reverse gear stage "Rev" or restricts the shift operations to the fifth gear stage "5th" and the sixth gear stage "6th". However, the gear shift stages that are prohibited by the shift operation restricting mechanism are not limited to these. For example, the shift lock pin for prohibiting the shift operation may be provided for each of the gear shift stages, and the gear shift stage, the shift operation to which is prohibited, may be set further finely in accordance with the vehicle speed V. In addition, a structure may appropriately be changed, for example, to a structure of only prohibiting the shift operation to the first gear stage "1st", a structure of only prohibiting the shift operation to the reverse gear stage "Rev", a structure of only prohibiting the shift operation to the second gear stage "2nd", or a structure of only prohibiting gear shifting to the sixth gear stage "6th".

In the above-described embodiment, the shift lock pin is controlled by the electric actuator. However, the shift lock pin may appropriately be controlled by an electromagnetic solenoid, a hydraulic actuator, or the like, for example. In addition, a shape and the like of the shift lock pin may appropriately be changed. Furthermore, structures of the shift operation restricting mechanisms 80, 100 are not necessarily limited to these. As long as a structure can prohibit the shift operation to each of the gear shift stages, such as a structure of closing a guiding groove for the shift position of each of the gear shift stages, the structure can appropriately be applied. Moreover, a structure that can prohibit the shift operation to each of the gear shift stages by using the gear pairs 14*a* to 14*f* of the manual transmission 14 or the synchromesh mechanisms 15*a* to 15*c* (the synchronizing mechanisms) may be applied.

In the above-described embodiment, the engine 12 is controlled at the idle speed during the coasting control. However, the engine 12 may be stopped during the coasting control.

In the above-described embodiment, the manual transmission 14 is the manual transmission with six forward gears and one reverse gear. However, the number of the gear shift stages is not limited. For example, the number of the gear shift stages may appropriately be changed to the four forward gears or the five forward gears.

In the above-described embodiment, the termination of the coasting control is determined on the basis of the depressing operation of the clutch pedal 22. However, the termination of the coasting control may be determined not only on the basis of the depressing operation of the clutch pedal 22 but also on the basis of the depressing operation of the accelerator pedal 50 and the depressing operation of the brake pedal. For example, when any one of the depressing operation of the clutch pedal 22, the depressing operation of the accelerator pedal 50, and the depressing operation of the brake pedal is detected, the termination of the coasting control may be determined.

Note that what has been described above is merely one embodiment and the invention can be implemented in aspects in which various modifications and improvements are made to the invention on the basis of knowledge of those skilled in the art.

What is claimed is:

1. A controller for a vehicle,
the vehicle including
an engine,
a transmission configured to shift gears through a shift operation by a driver, and
a clutch configured to connect and disconnect a power transmission route between the engine and the transmission by switching between a connected state and a disconnected state,
the controller comprising
an electronic control unit configured to:
execute coasting control for blocking the power transmission route between the engine and the transmission by placing the clutch in the disconnected state when a specified condition is established during traveling of the vehicle; and
control the transmission so as to prohibit a shift operation to a particular gear when the coasting of the vehicle is continued with the clutch remaining in the disconnected state after permitting the transmission to be switched to neutral by the driver during the coasting control.

2. The controller according to claim 1, wherein
the electronic control unit is configured to
change the particular gear in accordance with a magnitude of a vehicle speed during the coasting control.

3. The controller according to claim 1, wherein
the transmission includes a gear shift prohibition section,
the gear shift prohibition section is configured to prohibit the shift operation, and
the electronic control unit is configured to
control the gear shift prohibition section so as to prohibit shifting to the particular gear.

4. The controller according to claim 3, wherein
the gear shift prohibition section includes lock pins, and
the electronic control unit is configured to
control the lock pins to prohibit shifting to the particular gear.

5. A control method for a vehicle,
the vehicle including
an engine,
a transmission configured to shift gears through a shift operation by a driver,
a clutch configured to connect and disconnect a power transmission route between the engine and the transmission by switching between a connected state and a disconnected state, and an electronic control unit, the control method comprising:

executing, by the electronic control unit, coasting control for blocking the power transmission route between the engine and the transmission by placing the clutch in the disconnected state when a specified condition is established during traveling of the vehicle; and     controlling, by the electronic control unit, the transmission so as to prohibit a shift operation to a particular gear when the coasting of the vehicle is continued with the clutch remaining in the disconnected state after the permitting the transmission to be switched to neutral by the driver during the coasting control.

6. The control method according to claim 5 further comprising changing, by the electronic control unit, the particular gear in accordance with a magnitude of a vehicle speed during the coasting control.

7. The control method according to claim 5, wherein the transmission includes a gear shift prohibition section,     the gear shift prohibition section being configured to prohibit the shift operation, the method further comprising     controlling, by the electronic control unit, the gear shift prohibition section so as to prohibit shifting to the particular gear.

8. The control method according to claim 7, wherein the gear shift prohibition section includes lock pins, the method further comprising     controlling, by the electronic control unit, the lock pins so as to prohibit shifting to the particular gear.

9. The controller according to claim 1, wherein the transmission is switchable between a plurality of gears, and the electronic control unit is configured to prohibit the shift operation to a first portion of the plurality of gears, while allowing the shift operation to a second portion of the plurality of gears, when the coasting of the vehicle is continued with the clutch remaining in the disconnected state after permitting the transmission to be switched to neutral by the driver during the coasting control.

10. The control method according to claim 5, wherein the transmission is switchable between a plurality of gears, and the control method includes the electronic control unit prohibiting the shift operation to a first portion of the plurality of gears, while allowing the shift operation to a second portion of the plurality of gears, when the coasting of the vehicle is continued with the clutch remaining in the disconnected state after permitting the transmission to be switched to neutral by the driver during the coasting control.

* * * * *